(12) United States Patent
Cho et al.

(10) Patent No.: US 7,884,894 B2
(45) Date of Patent: Feb. 8, 2011

(54) LIQUID CRYSTAL DISPLAY DEVICE HAVING PARTICULAR BACKLIGHT CONTAINER AND REFLECTIVE MEMBER ARRANGEMENT

(75) Inventors: Joo-woan Cho, Seoul (KR); Seong-sik Choi, Seooul (KR); Du-hwan Chung, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 436 days.

(21) Appl. No.: 11/931,451

(22) Filed: Oct. 31, 2007

(65) Prior Publication Data

US 2008/0180593 A1 Jul. 31, 2008

(30) Foreign Application Priority Data

Jan. 25, 2007 (KR) .................... 10-2007-0007770

(51) Int. Cl.
*G02F 1/1333* (2006.01)
*G02F 1/1335* (2006.01)
*G09F 13/08* (2006.01)
*F21S 4/00* (2006.01)

(52) U.S. Cl. .................... 349/58; 349/67; 349/70; 362/97.2; 362/225

(58) Field of Classification Search ............. 349/58, 349/67, 70; 362/97.2, 224, 225, 241, 247
See application file for complete search history.

(56) References Cited

U.S. PATENT DOCUMENTS

2005/0057946 A1* 3/2005 Kim .................... 362/561
2005/0243540 A1* 11/2005 Kim .................... 362/97
2006/0044779 A1* 3/2006 Lee .................... 362/29

FOREIGN PATENT DOCUMENTS

| KR | 1020060010545 A | 7/2004 |
| KR | 1020050027623 A | 3/2005 |
| KR | 1020050107034 A | 11/2005 |
| KR | 1020050118360 A | 12/2005 |

* cited by examiner

*Primary Examiner*—Michael H Caley
(74) *Attorney, Agent, or Firm*—Cantor Colburn LLP

(57) ABSTRACT

A liquid crystal display device includes a liquid crystal display panel, a plurality of lamps disposed behind the liquid crystal display panel, and a container which accommodates the lamps. The container includes a first container component parallel with the liquid crystal display panel and disposed behind the lamp, a second container component upwardly bent from an end part of the first container component, and a third container component that is cut away from the first container component and is upwardly bent from the first container component. The liquid crystal display device also includes a reflective member including a first reflective member at least partially disposed between the first container component and the lamp, and a second reflective member separated from the first reflective member and covering the third container component.

23 Claims, 14 Drawing Sheets

FIG. 6

| | | |
|---|---|---|
| 564 → 592<br>5.0% | 560 → 568<br>1.4% | 541 → 556<br>2.8% |
| 608 → 656<br>7.9% | 613 → 640<br>4.4% | 580 → 616<br>6.2% |
| 569 → 609<br>7.0% | 592 → 616<br>4.1% | 591 → 624<br>5.6% |

LIQUID CRYSTAL DISPLAY DEVICE HAVING PARTICULAR BACKLIGHT CONTAINER AND REFLECTIVE MEMBER ARRANGEMENT

This application claims priority to Korean Patent Application No. 10-2007-0007770, filed on Jan. 25, 2007, and all the benefits accruing therefrom under 35 U.S.C. §119, the contents of which in its entirety are herein incorporated by reference.

BACKGROUND OF INVENTION (a) Field of Invention

The present invention relates to a liquid crystal display device.

(b) Description of the Related Art

Flat panel display devices, such as a liquid crystal display ("LCD") device, a plasma display panel ("PDP"), an organic light emitting diode ("OLED") and the like have been widely developed, replacing conventional cathode ray tubes ("CRTs").

Among these flat panel display devices, the liquid crystal display device includes a liquid crystal panel, which, in turn, includes a first substrate provided with a thin film transistor, a second substrate opposed to the first substrate, and a liquid crystal layer interposed therebetween. The liquid crystal layer does not by itself emit light; thus, a backlight unit is provided in back of the first substrate to provide light. Transmissivity of the light emitted from the backlight unit is controlled according to an arrangement of liquid crystals.

Backlight units are classified into edge types and direct types, depending on a position of the light source with respect to the device.

For the direct type backlight unit, a plurality of light sources are provided over the liquid crystal panel, and an optical plate is provided between the light sources and the liquid crystal panel. The direct type backlight unit can provide a high brightness, so it is widely applied in liquid crystal display devices having large screens.

Lamps are widely used as the light source of the direct type backlight unit. The direct type backlight unit has a side mold for accommodating an end portion of the lamps and for supporting the optical plate.

However, conventional side molds require somewhat complicated configuration in order to support elements of the backlight unit. In addition, these side molds prevent efficient radiation of heat generated from the lamp.

BRIEF SUMMARY OF THE INVENTION

Accordingly, it is an aspect of the present invention to provide a liquid crystal display device having a simplified configuration.

In an exemplary embodiment of the present invention, a liquid crystal display device includes a liquid crystal display panel, a plurality of lamps disposed behind the liquid crystal display panel, and a container which accommodates the lamps and includes a first container component parallel with the liquid crystal display panel and disposed behind the lamp, a second container component upwardly bent from an end part of the first container component, and a third container component that is cut away from the first container and is upwardly bent from the first container component. The liquid crystal display device also includes a reflective member that includes a first reflective member at least partially disposed between the first container component and the lamp, and a second reflective member separated from the first reflective member and covering the third container component.

An end part of the lamp may be disposed between the second and third container components.

The container may further include a fourth container component which is bent from an upper end part of the third container component and extends toward the second container component and in parallel with the liquid crystal display panel.

The liquid crystal display device may further include an optical plate disposed between the liquid crystal display panel and the lamp, and the fourth container component may support an end part of the optical plate.

The third container component may be plurally provided and arranged in a transverse direction to a lengthwise direction of the lamp, and the lamp may be arranged between neighboring third container components.

The second reflective member may be extended in a direction transverse to the lengthwise direction of the lamp. The second reflective member may include a lower side facing the first container component, an upper side facing the liquid crystal display panel, and an accommodating cutting part to accommodate the lamp.

The container may further include a fourth container component which is bent from an upper end part of the third container component and extending toward the second container component and in parallel with the liquid crystal display panel. The container may further include a fifth container component which holds the upper side of the second reflective member and prevents the upper side of the second reflective member from moving inward.

The container may further include a sixth container component extended parallel with an extending direction of the lamp and is upwardly bent from an end part of the first container component. The first reflective member may be extended over the sixth container component. The sixth container component and the first reflective member correspond to the sixth container component and are formed with coupling cutting parts to be coupled with end parts of the second reflective member, respectively.

The first container component may include a container cutting part which corresponds to the third container component.

The first reflective member may include a coupling through hole corresponding to the container cutting part. The second reflective member may include a protrusion which protrudes from a lower side facing the first container component and passes through the coupling through hole and the container cutting part.

The liquid crystal display device may further include a light blocking member attached to a rear surface of the first container component and covering the container cutting part.

The second reflective member may be arranged at an obtuse angle with respect to the first container component.

The liquid crystal display device may further include a lamp socket which is at least partially disposed between the second container component and the third container component and connected with an end part of the lamp to supply power to the lamp.

The liquid crystal display device may further include an inverter placed on a rear surface of the first container component. The first container component, which is outside the third container component, may be formed with a socket through hole, and the lamp socket may include a socket main body to be connected with an end part of the lamp, and an inverter connecting part exposed to an outside of the container through the socket through hole and connected to the inverter.

The liquid crystal display device may further include an optical plate disposed between the liquid crystal display panel and the lamp, and a mold frame. The mold frame may include a first mold part supported by the second container component, and a second mold part extended from the first mold part over an optical plate. An end part of the liquid crystal display panel may be seated on the second mold component.

The second container component may be formed with a container through hole, and the mold may further include a third mold part extended from the first mold component to an inside of the second container and covering the container through hole.

The mold may further include a fourth mold part extended from the first mold component to an outside of the second container and covering the container through hole.

Another exemplary embodiment of a liquid crystal display device includes a liquid crystal display panel, a plurality of lamps disposed behind the liquid crystal display panel, and an optical plate disposed between the liquid crystal panel and the lamp. The liquid crystal display device also includes a container which accommodates the lamp therein, and a reflective member which is at least partially disposed between the container and the lamp and surrounds a lighting space together with the optical plate. The container supports an end part of the optical plate. The reflective member includes a first reflective member at least partially disposed between the first container component and the lamp, and a second reflective member separated from the first reflective member and formed with an accommodating cutting part to accommodate the lamp.

The container may include a first container component parallel with the liquid crystal display panel and disposed behind the lamp, a second container component upwardly bent from an end part of the first container component, a third container component that is cut away from the first container component and is upwardly bent from the first container component, and a fourth container component that is bent and extended upwardly from an end part of the third container component toward the second container component and in parallel with the liquid crystal display panel. An end of the optical plate may be seated on the fourth container component.

The second reflective member may be at least partially disposed between the lighting space and the third container component.

The second reflective member may be extended in a direction transverse to the lengthwise direction of the lamp. The second reflective member may include a lower side facing the first container component, an upper side facing the liquid crystal display panel, and an accommodating cutting part to accommodate the lamp therein.

The third container component may be plurally provided and arranged in a transverse direction to the lengthwise direction of the lamp. The lamp may be arranged between neighboring third container components.

The first container component may include a container cutting part corresponding to the third container part.

The second reflective member may be arranged at an obtuse angle with respect to the first container component.

BRIEF DESCRIPTION OF THE DRAWINGS

The above and other aspects, features, and advantages of the present invention will become apparent and more readily appreciated from the following description of the exemplary embodiments, taken in conjunction with the accompanying drawings, in which:

FIG. 6 is a diagram illustrating brightness characteristics of the liquid crystal display device according to the first exemplary embodiment of the present invention;

DETAILED DESCRIPTION OF THE INVENTION

Figure 1:
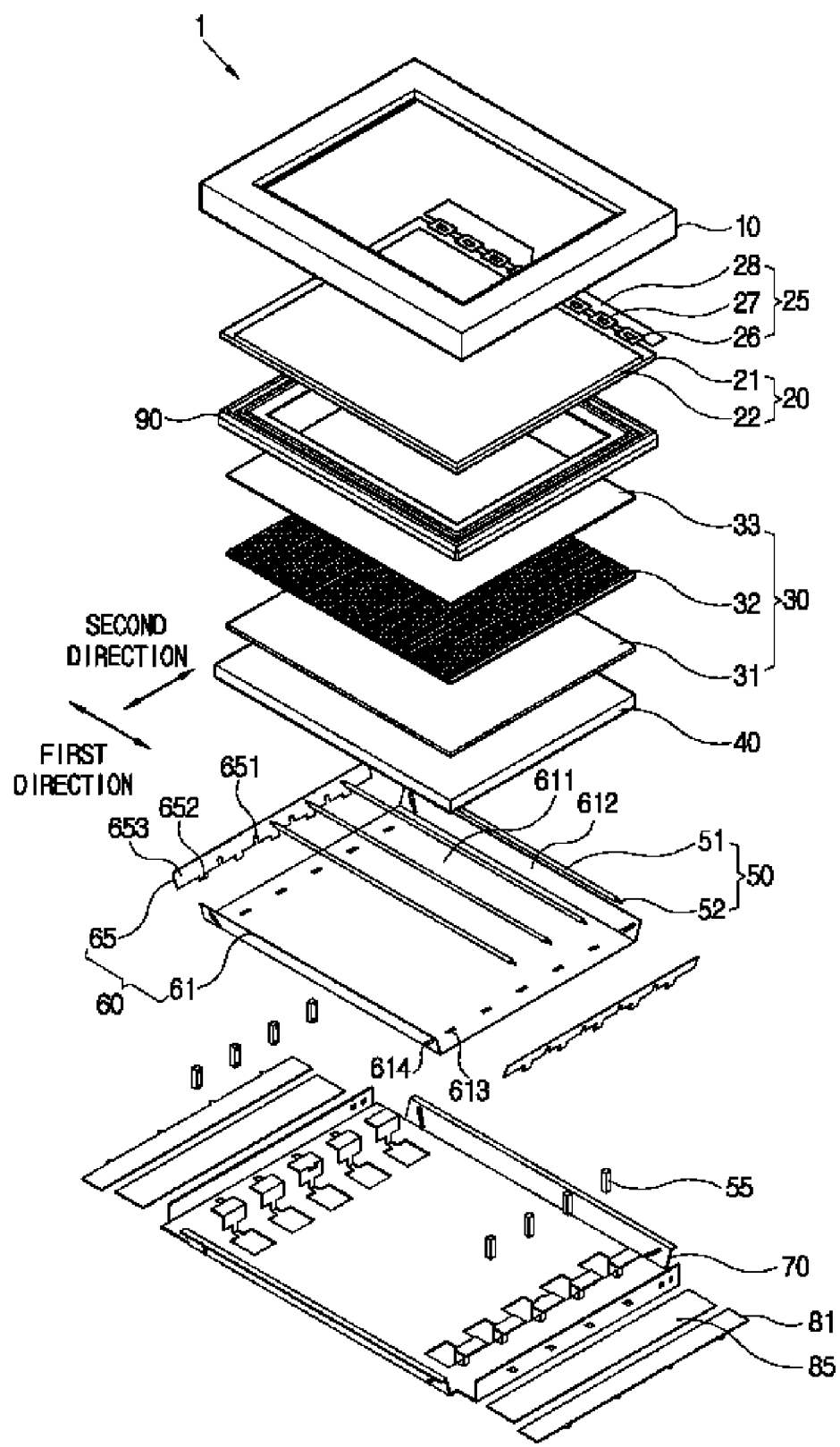
FIG. 1 is an exploded perspective view of a liquid crystal display device according to a first exemplary embodiment of the present invention.

The invention now will be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Figure 2:
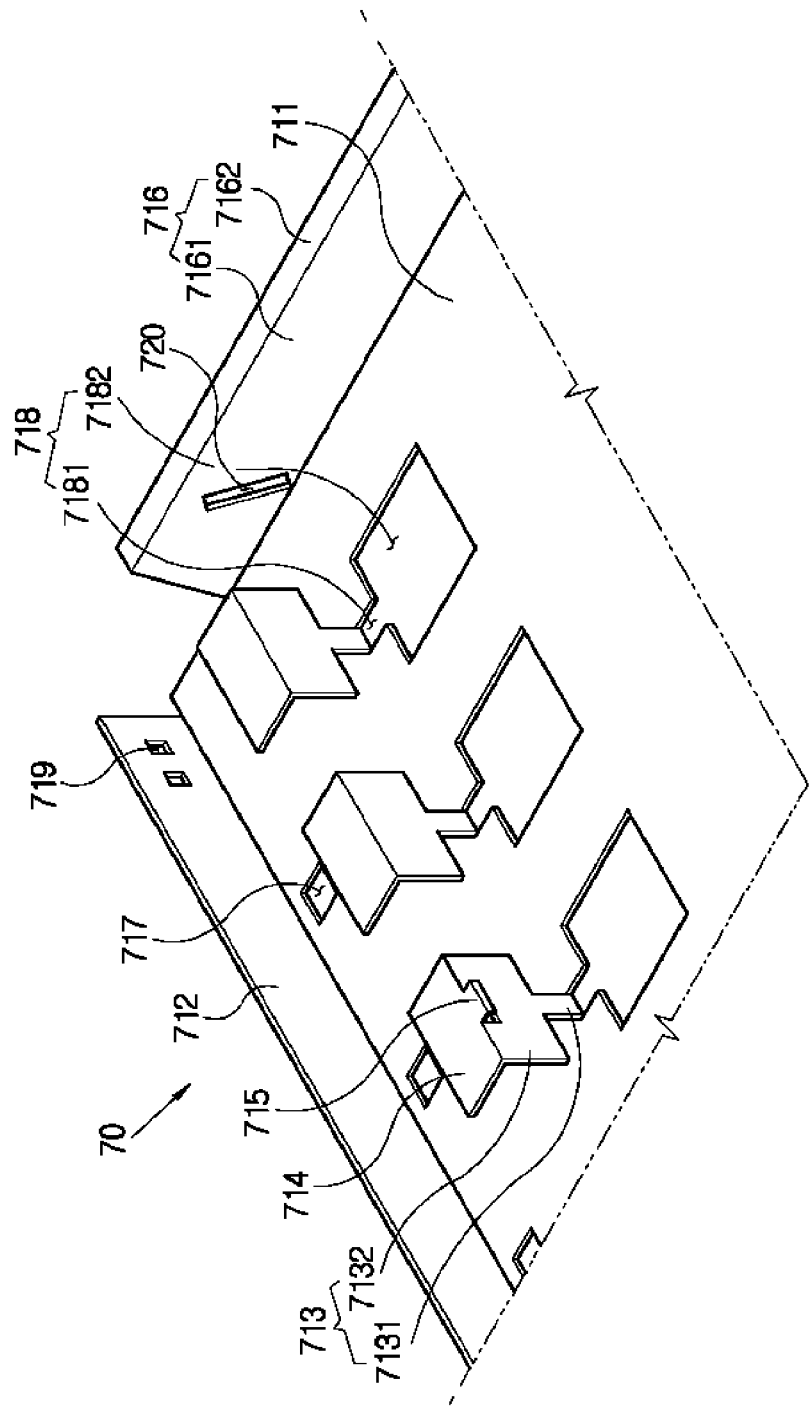
FIG. 2 is a perspective view of a portion of a lower container of the liquid crystal display device according to the first exemplary embodiment of the present invention.
Figure 3:
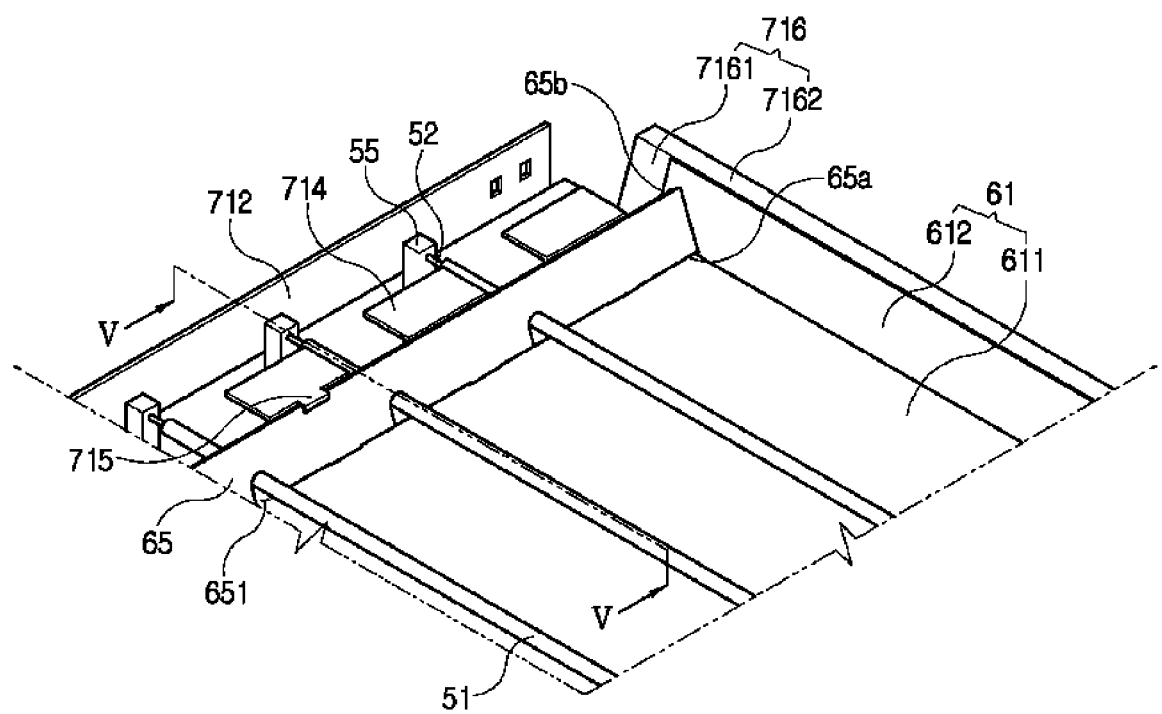
FIG. 3 is a perspective view of a lower container assembled with a reflective member according to the first exemplary embodiment of the present invention.
Figure 4:
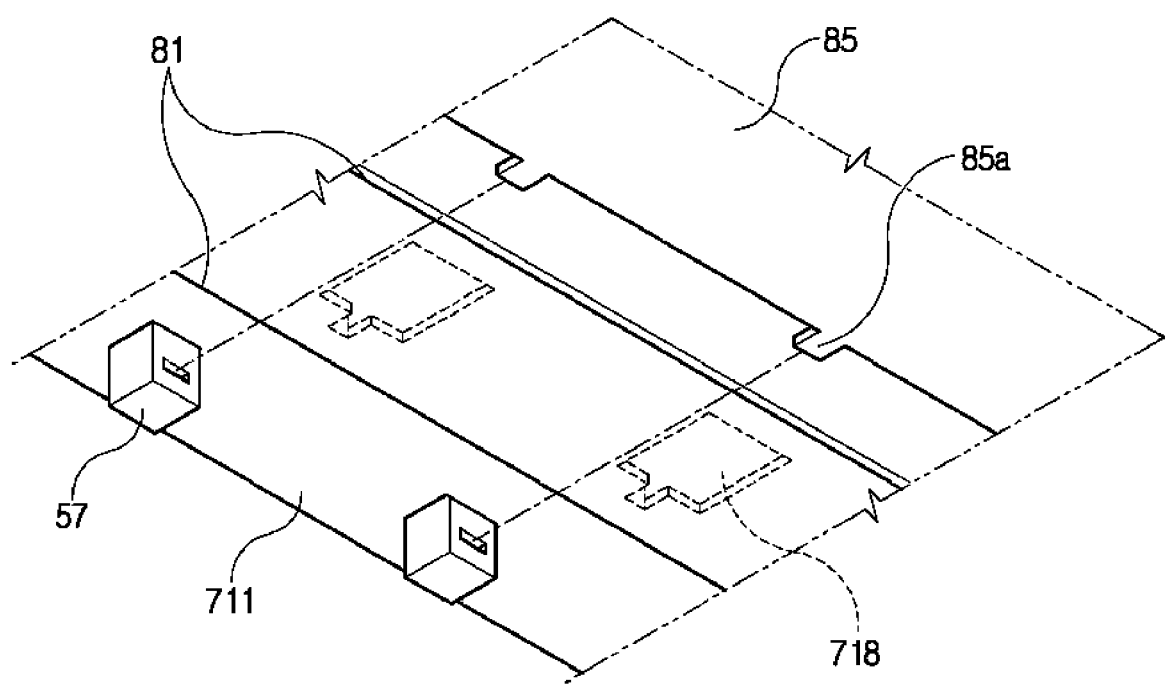
FIG. 4 is a diagram of a portion of a lower surface of a lower container and illustrating assembly of an inverter and light blocking member to the lower container according to the first exemplary embodiment of the present invention.
Figure 5:
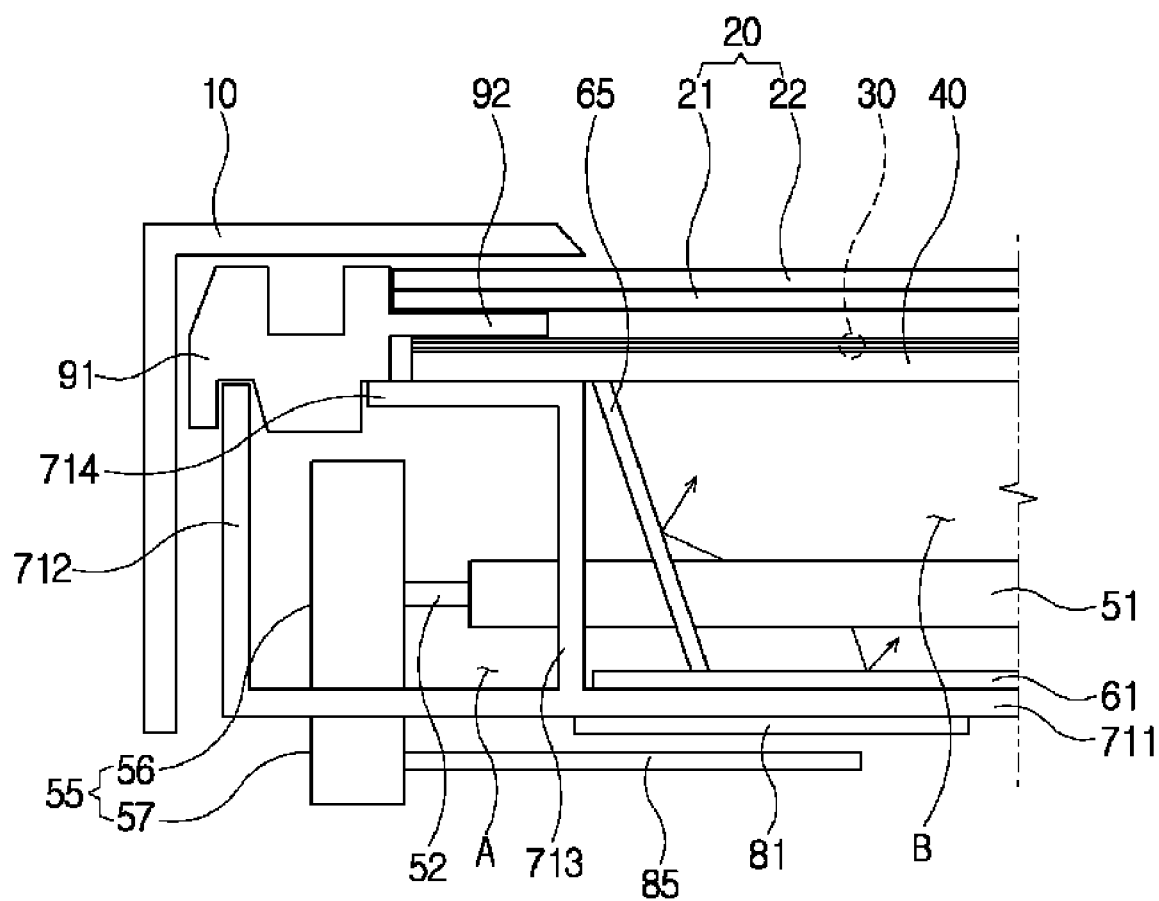
FIG. 5 is a cross-sectional view, taken along line V-V of FIG. 3.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention. A liquid crystal display device according to a first exemplary embodiment of the present invention will now be described in more detail with reference to FIGS. 1 through 5. FIG. 1 is an exploded perspective view of a liquid crystal display device according to a first exemplary embodiment of the present invention; FIG. 2 is a perspective view of a portion of a lower container of the liquid crystal display device according to the first exemplary embodiment of the present invention; FIG. 3 is a perspective view of a lower container assembled with a reflective member according to the first exemplary embodiment of the present invention; FIG. 4 is a diagram of a portion of a lower surface of a lower container and illustrating assembly of an inverter and light blocking member to the lower container according to the first exemplary embodiment of the present invention; and FIG. 5 is a cross-sectional view, taken along line V-V of FIG. 3.

Referring to FIG. 1, a liquid crystal display device 1 includes a liquid crystal display panel 20, a optical film 30 located in the back of the liquid crystal display panel 20, a diffusion plate/optical plate 40 located in the back of the optical film 30, a lamp 50 located in the back of the diffusion plate 40, and reflective members 60 located at the ends and at the sides of the lamps 50. Reflective member 60 includes a first reflective member 61 and a second reflective member 65 as described further herein. The liquid crystal display panel 20 may be seated on a mold frame 90.

The above-described elements are contained between an upper container 10 and a lower container 70. Behind the lower container 70 a light blocking member 81 and an inverter 85 are located. Both ends of the lamp 50 are connected to a lamp socket 55 fixed to the lower container 70.

The liquid crystal display panel 20 includes a first substrate 21 and a second substrate 22 facing the first substrate 21. Between the substrates 21 and 22, a liquid crystal layer (not shown) is located. The liquid crystal display panel 20, which controls an arrangement of the liquid crystal layer to form an image, is not a light emitting element so that light should be provided from the lamp 50 located in the back of the panel 20.

On a side of the first substrate 21, a driving part 25 for applying a driving signal is provided. The driving part 25 includes a flexible printed circuit ("FPC") substrate 26, a driving chip 27 mounted on the flexible printed circuit (FPC) substrate 26, and a printed circuit board ("PCB") 28 connected to the flexible printed circuit (FPC) substrate 26. As shown in FIG. 1, the driving part 25 is a chip on film ("COF") method; however, it will be understood that other methods may be employed, such as a tape carrier package ("TCP") method, a chip on glass ("COG") method, etc. Also, a portion of the driving part 25 may be directly formed on the first substrate 21.

The optical film 30 located in the back of the liquid crystal display panel 20 includes a diffusion film 31, a prism film 32 and a protective film 33.

The diffusion film 31 diffuses light incident through the diffusion plate 40 as an optical plate, and suppresses the formation of a bright line due to the lamp 50.

An upper surface of the prism film 32 may be formed to have an arrangement of triangular prisms. The prism film 32 collects light diffused from the diffusion film 31 in a vertical direction of a plane of the liquid crystal display panel 20. The prism film 32 may be provided as two sheets with micro prisms formed on each of the sheets forming a predetermined angle. Light passing through the prism film 32 vertically travels so that it provides a uniform brightness distribution.

The protective film 33 disposed above the prism film 32 protects the prism film 32 from scratches.

The diffusion plate 40 under the diffusion film 31 may include polymetyl methacrylate ("PMMA"), poly carbonate ("PC"), or the like. The diffusion plate 40 may have a diffusion agent scattered therein, or may be coated with a diffusive material layer.

The diffusion plate 40 is thick enough to have relatively high strength, such that a gap between the diffusion plate 40 and the reflective member 60 can be kept relatively constant.

Although not shown, a supporter may be used to maintain a consistent gap between the diffusion plate 40 and the reflective member 60, and between the lamp 50 and the reflective member 60.

The lamp 50 may be plurally provided, each of which is longitudinally extended in a first direction. The lamps 50 are arranged in parallel with each other along a second direction at regular intervals and disposed throughout the back of the liquid crystal display panel 20. The lamps 50 include lamp main bodies 51 and lamp electrodes 52. The lamp electrodes 52 are placed at opposite ends of the lamp main bodies 51.

The lamp 50 may include a cold cathode fluorescent lamp ("CCFL") or an external electrode fluorescent lamp ("EEFL"). A substantial portion of the lamp main bodies 51 is placed in a lighting space (refer to "B" in FIG. 5) that is surrounded by the diffusion plate 40 and the reflective member 60. Further, a remaining portion of the lamp main bodies 51 (i.e., portions not contained in space B) and the lamp electrodes 52 at the opposite ends of the lamp 50 are placed in an accommodating space (refer to "A" in FIG. 5) that is outside the reflective member 60. The lamp electrode 52 is connected with a lamp socket 55 to receive power. The lamp socket 55 will be described further herein.

According to an exemplary embodiment of the present invention, the reflective member 60 is correlated with the lower container 70 covered with the reflective member 60. The correlation between the reflective member 60 and the low container 70 will be described below.

Referring to FIGS. 2 and 5, the lower container 70 includes a first container component 711 through a sixth container component 716.

The first container component 711 is in parallel with the liquid crystal display panel 20, and may have a substantially rectangular shape. Two ends of the first container component 711 are located in the accommodating space A, and a center of the first container component 711, are located in the lighting space B.

On the first container component 711, socket through holes 717 and container cutting parts 718 are formed.

The socket through holes 717 are located in the accommodating space A, and are arranged along the second direction at regular intervals. The socket through holes 717 and the container cutting parts 718 are alternately formed along the second direction.

The container cutting parts 718 are located in the lighting space B, and each of the container cutting parts 718 corresponds to a third container component 713 and a fourth container component 714. The container cutting part 718 includes a first portion 7181 with a relatively narrow width and a second portion 7182 with a relatively broad width (e.g., the second portion 7182 is wider than the first portion 7181). The first portion 7181 corresponds to a portion of the third container component 713 (7131), and the second portion 7182 corresponds to the remainder of the third container component 713 and the fourth container component 714.

The container cutting part 718 is formed inward (e.g., in the first direction) with respect to the third container component 713.

The second container component 712 is extended along the second direction, and formed as a pair with the first container component 711 interposed therebetween. The second container component 712 is bent and extended upward from an end portion of the first container component 711. Container through holes 719 are formed in the second container component 712.

Some of the container through holes 719 may be implemented as user holes for combining the container with a frame (not shown); the others may bee formed for reducing the weight or for convenience of manufacturing.

The third container component 713 is a portion of the first container component 711 that is cut away from the first container component 711, and may be plurally provided along the second direction (e.g., in a transverse direction to a lengthwise direction of the lamp 50). Each of the third container components 713 includes a lower first portion 7131 with a relatively narrow width and an upper second portion 7132 with a relatively broad width (e.g., the upper second portion 7132 is wider than the lower first portion 7131).

According to this exemplary embodiment of the present invention, the third container component 713 is perpendicular to the first container component 711. Alternatively, the third container component 713 may be arranged at an obtuse angle with respect to the first container component 711 in the lighting space B.

The fourth container component 714 is bent from an upper edge of the third container component 713 and extends toward the second container component 712. The fourth container component 714 in parallel with the liquid crystal display panel 20, and a portion of the diffusion plate 40 are seated on the fourth container component 714.

One end portion of the fourth container component 714 is connected with the third container component 713, while the other end portion is not supported. However, the lower container 70 may include metallic materials with relatively high strength so that the third container component 713 and the fourth container component 714 are stably secure when the diffusion plate 40 is seated thereon.

The fifth container component 715 is a portion of the third container component 713 that is cut away from the third container component 713. The fifth container component 715 is formed at a boundary of the third container component 713 and the fourth container component 714, and protrudes toward the lighting space B. As shown in FIG. 3, the fifth container component 715 is joined to an upper side 65b of the second reflective member 65, thereby preventing the second reflective member 65 from moving inwards.

The sixth container component 716 is extended along the first direction, and formed as a pair with the first container component 711 interposed therebetween. The sixth container component 716 is bent and extended upward from a portion of the first container component 711. The sixth container component 716 includes a first portion 7161 connected to the first container component 711 and a second portion 7162 extended from an end portion of the first portion of the 7161.

The first portion 7161 is arranged at an obtuse angle with respect to the first container component 711, and the second portion 7162 is extended in parallel with the liquid crystal display panel 20. The other portion of the diffusion plate 40 is seated on the second portion 7162.

Referring to FIG. 3, the first portion 7161 is covered with the first reflective member 61. On the first portion 7161 and the first reflective member 61, coupling cutting parts 720 (FIG. 2) and 614 (FIG. 1) are formed corresponding to each other. An end portion of the second reflective member 65 is coupled with the coupling cutting parts 720 and 614, thereby preventing the second reflective member 65 from moving.

Although it is not shown, coupling protrusions are formed on one of the upper container 10 and the second container component 712 and coupling depressions may be formed on the other of the upper container 10 and the second container component 712.

The lower container 70 described above may be formed from metallic materials such as aluminum, stainless steel, and the like, and may be formed as a single body.

Referring to FIGS. 1, 3, and 5, the reflective members 60 include the first reflective member 61 and the second reflective member 65, which are separated from each other. The second reflective member 65 is formed as a pair. The reflective member 60 reflects light supplied from the lamp 50, which is supplied to the diffusion plate 40.

The first reflective member 61 covers a portion of the first container component 711 and a portion of the sixth container component 716. In particular, the first reflective member 61 includes a first portion 611 covering the first container component 711 located in the lighting space B and a second portion 612 bent from the first portion 611 and covering the first portion 7161 of the sixth container component 716.

The first portion 611 may have a substantially rectangular shape, and coupling through holes 613 are formed on both ends thereof in the first direction. The first portion 611 is positioned such that the coupling through holes 613 correspond to the container cutting parts 718.

The second portion 612 is longitudinally extended along the first direction, and formed as a pair with the first portion 611 interposed therebetween. On the second portion 612, the aforementioned coupling cutting parts 614 are formed.

The first reflective member 61 is formed as a sheet, and may be made of plastic material such as polyethylene terephthalate ("PET"), poly carbonate ("PC"), and the like.

The first reflective member 61 described above may be attached to the lower container 70 using, e.g., double-sided tape.

The second reflective member 65 is extended in a direction transverse to the lengthwise direction of the lamp 50 (e.g., longitudinally extended along the second direction), and arranged at obtuse angle with respect to the first portion 611 in the lighting space B. In other words, the second reflective member 65 is arranged to be closer to the second container component 712 as it gets closer to the liquid crystal display panel 20.

As shown in FIGS. 1 and 3, the second reflective member 65 is provided with accommodating cutting parts 651 through which the lamp 50 is passed and protrusions 652 protruded downwardly.

The accommodating cutting part 651 is extended from a lower side 65a facing the first container component 711 toward the upper side 65b facing the liquid crystal display panel 20. The accommodating cutting parts 651 are interposed between neighboring third container components 713 and arranged at regular intervals.

The protrusions 652 are extended from the lower side 65a to pass through the coupling through holes 613 formed in the first reflective member 61 and the container cutting parts 718.

Further, both ends 653 of the second reflective member 65, as described above, are coupled with the coupling cutting parts 720 and 614, and a portion of the upper side 65b is coupled with the fifth container component 715.

The second reflective member 65 is prevented from moving by the aforementioned passing through the coupling through holes 613 and the container cutting parts 718 of the protrusion 652 (first coupling), coupling both ends 653 with the coupling cutting parts 720 and 614 (second coupling), and coupling the upper side 65b with the fifth container component 715 (third coupling).

The second reflective member 65 may include micro-forming polyethylene terephthalate or the like, and may be formed by injection molding or the like. The second reflective member 65 facing the lighting space B may be coated with a reflective metal.

The second reflective member 65 may be thicker than the first reflective member 61.

Referring to FIGS. 4 and 5, the lamp socket 55 will now be described.

The lamp socket 55 is coupled to the socket through hole 717 formed on the first container component 711. The lamp socket 55 is located in the accommodating space A between the second container component 712 and the third container component 713. Further, the lamp socket 55 includes a socket main body 56 to be connected to the lamp electrode 52, and an inverter connecting part 57 exposed to the outside of the lower container 70 through the socket through hole 717 so as to be connected to the inverter 85. The lamp socket 55 may include a conductive metal.

Referring to FIG. 4, a light blocking member 81, such as a light blocking tape or the like, is attached to the outside surface of the first container component 711. The light blocking member 81 is extended lengthwise in the second direction, and covers the container cutting part 718. The inside of the lower container 70 is blocked off from the outside by the light blocking member 81, thereby preventing foreign materials from entering the lower container 70.

The light blocking member 81 also prevents light generated in the lighting space B from leaking through the container cutting part 718.

The portion of the lamp main body 51 located in the accommodating space A is disposed relatively close in proximity to the lamp electrode 52 and generally has lower brightness than the portion of the lamp main body 51 that is located in the lighting space B. According to an exemplary embodiment of the present invention, the lamp main body 51 having the lower brightness is located in the accommodating space A, so that uniformity of brightness of the liquid crystal display device 1 is improved.

Alternatively, the light blocking member 81 may be located on an inner surface of the first container component 711, and may be configured as separate elements, each of which covers a corresponding container cutting part 718.

Referring to FIGS. 1 and 4, a pair of inverters 85 is provided outside the first container component 711. The inverter 85 is formed with a protrusion 85a. The protrusion 85a is inserted in the inverter connecting part 57 of the lamp socket 55.

Although not shown, the liquid crystal display device 1 may further include an inverter container to protect the inverter 85.

Alternatively, the lamp electrode 52 may be covered with a lamp supporter, and the lamp 50 may be connected with the inverter 85 by an electric wire.

Referring to FIGS. 1 and 5, the mold frame 90 includes a first mold part 91 shaped like a rectangular frame, and a second mold part 92 inwardly extended from the first mold part 91.

The first mold part 91 is seated on the second container component 712, and prevents the liquid crystal display panel 20 from moving along its surface direction. The second mold part 92 is extended parallel with the liquid crystal display panel 20 and supports an end part of the liquid crystal display panel 20.

According to the first exemplary embodiment of the present invention, the diffusion plate 40 is supported by the lower container 70, and the light generated by the lamp 50 is reflected from the reflective member 60 supported by the lower container 70 toward the diffusion plate 40.

Thus configured, a conventional side mold for supporting the diffusion plate 40 and reflecting the light of the lamp 50 is unnecessary, thereby simplifying the liquid crystal display device. Further, a yellowing of the side mold does not occur.

The lamp 50 generates substantial heat while operating, particularly at opposite end parts of the lamp electrode 52. If the generated heat is not properly radiated, the lamp 50 increases in temperature, thereby decreasing the brightness of the lamp 50.

According to the first exemplary embodiment of the present invention, the container cutting part 718 is disposed in close proximity to the lamp electrode 52, so that the heat can be efficiently radiated from the lamp electrode 52. Further, the lamp electrode 52 is surrounded with the lower container 70 made of high heat-conductive metal, thereby facilitating the heat-radiation.

The heat-radiation efficiency of the liquid crystal display device 1 according to the first exemplary embodiment of the present invention is supported by experiments, and the experimental results will be described with reference to FIG. 6. The lamps are extended along a horizontal direction of FIG. 6.

In this experiment, twelve lamps are used and exterior temperature is maintained at 24 degrees Celsius. Under this condition, a conventional case with the side mold and the exemplary case without the side mold are compared in brightness with respect to nine points.

In the results, the brightness is improved at all points as shown in FIG. 6. Particularly, the brightness is enhanced at the opposite ends of the lamp. In FIG. 6, a unit of the brightness is "nit."

Referring to FIGS. 7A through 7D, an assembling method for the liquid crystal display device according to the first exemplary embodiment of the present invention is as follows.

Figure 7A:
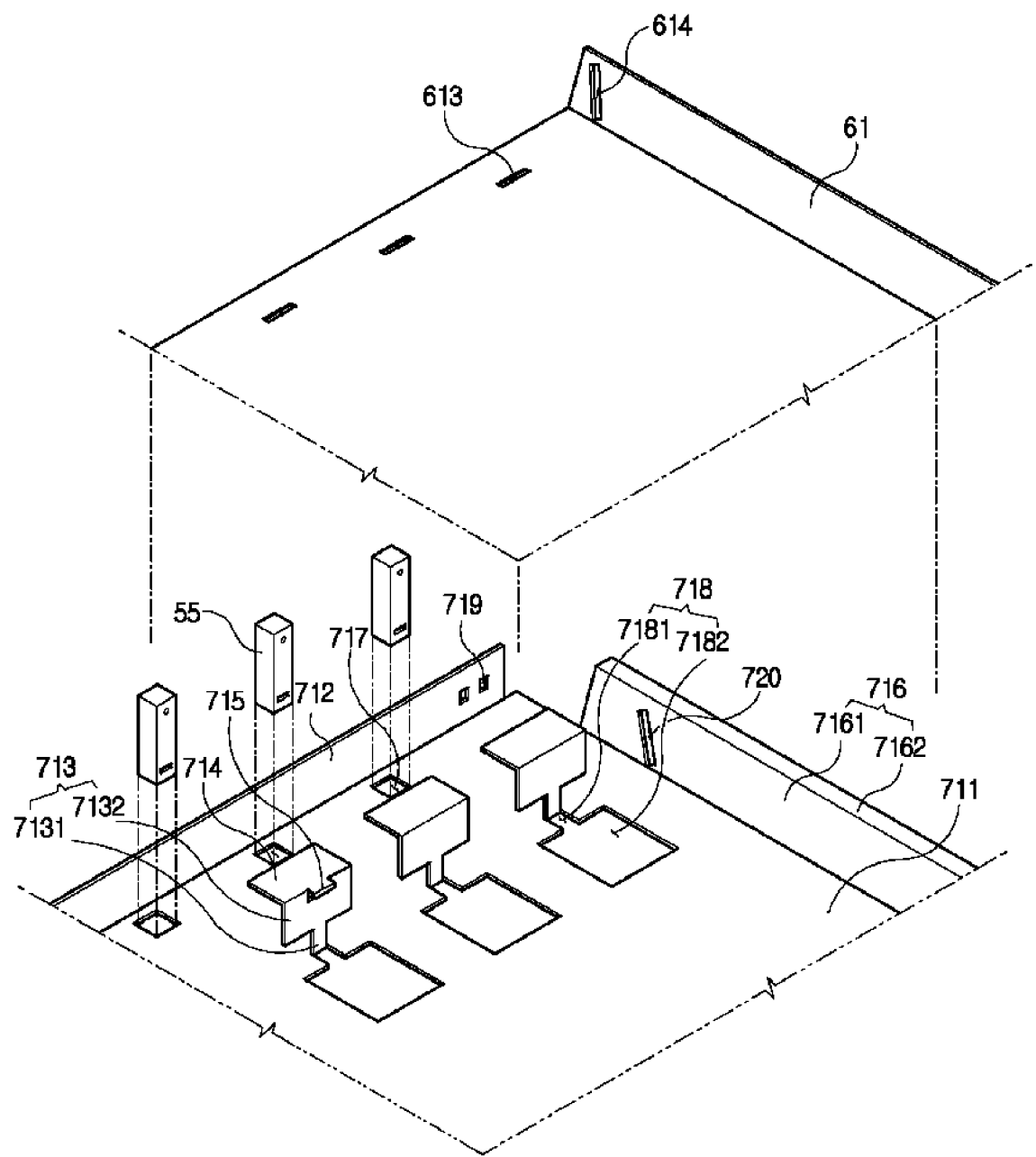
FIGS. 7A through 7D are diagrams describing an assembling method of the liquid crystal display device according to the first exemplary embodiment of the present invention.

As shown in FIG. 7A, the first reflective member 61 is coupled to the lower container 70. The first reflective member 61 may be attached to the lower container 70 with a double-sided tape. The lamp socket 55 is coupled to the socket through hole 717 of the lower container 70.

Figure 7B:
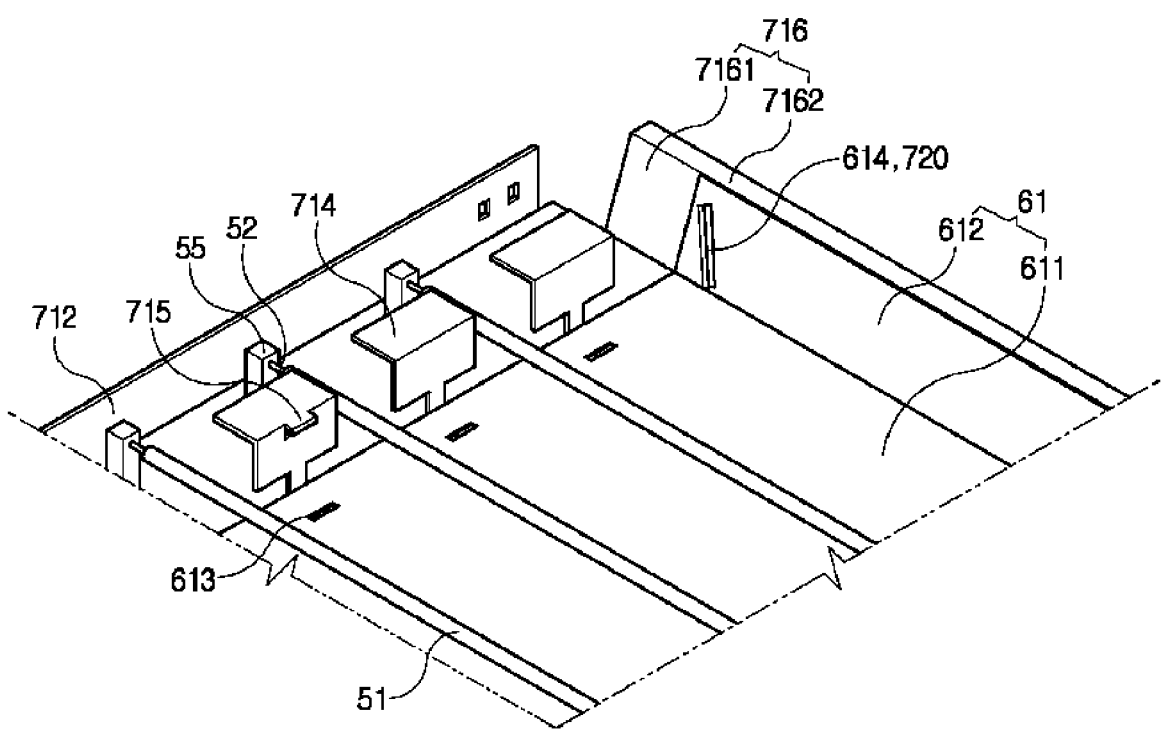

As shown in FIG. 7B, the lamp 50 is coupled following the coupling of the first reflective member 61 with the lower container 70.

The coupling through hole 613 of the first reflective member 61 corresponds to the container cutting part 718 of the lower container 70. The coupling cutting part 614 of the first reflective member 61 corresponds to the coupling cutting part 720 of the lower container 70.

Figure 7C:
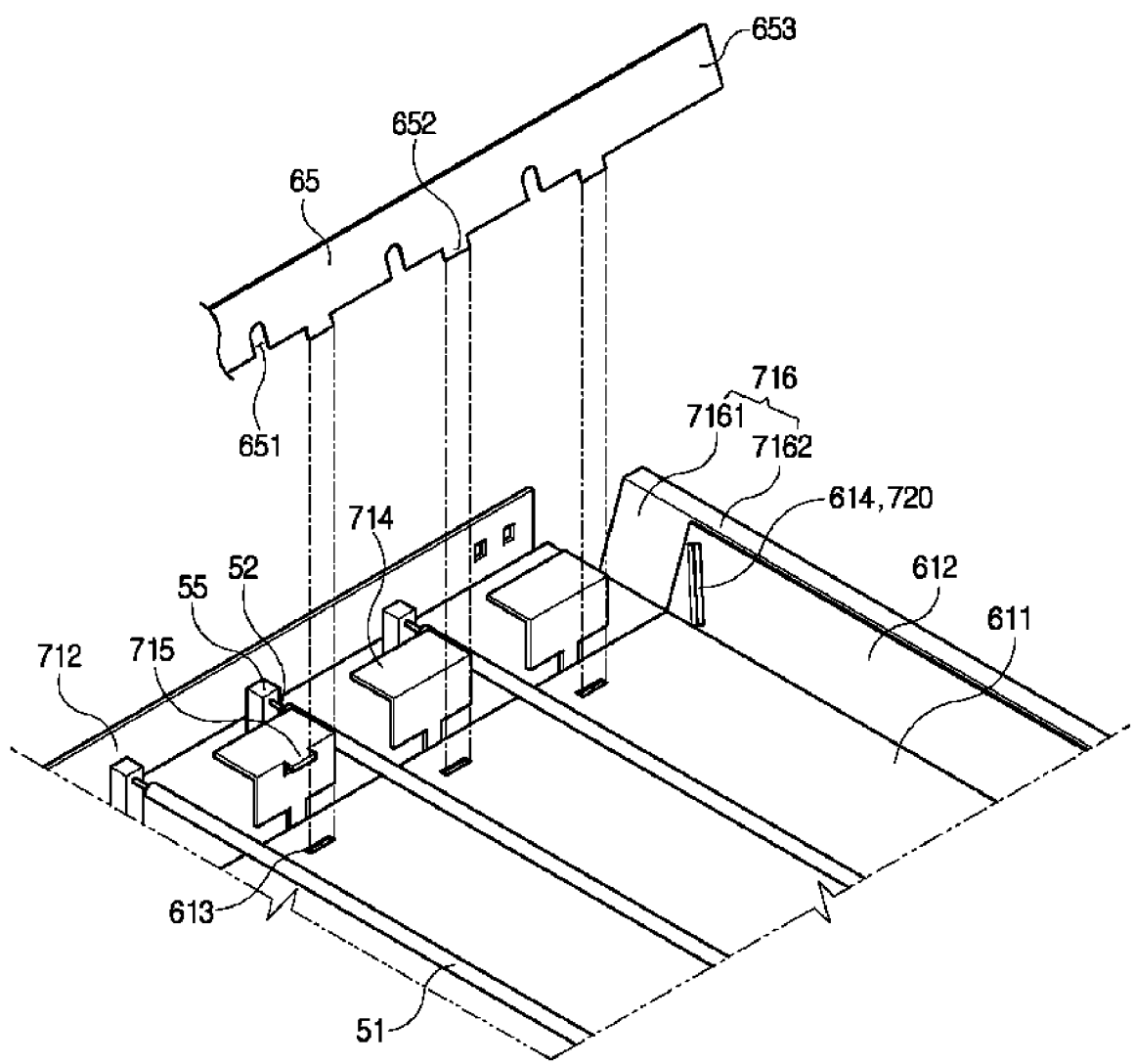

As shown in FIG. 7C, the second reflective member 65 is coupled to both the first reflective member 61 and the lower container 70 by inserting the protrusion 652 into the coupling through hole 613 and the container cutting part 718, and passing through the coupling though hole 613 and the container cutting part 718 (first coupling). As the protrusion 652 is inserted into the coupling through hole 613 and the container cutting part 718, the lamp 50 is accommodated in the accommodating cutting part 651.

In addition, opposite end parts 653 of the second reflective member 65 are coupled to the coupling cutting parts 720 and 614 of the respective lower container 70 and the reflective member 60 (second coupling).

Figure 7D:
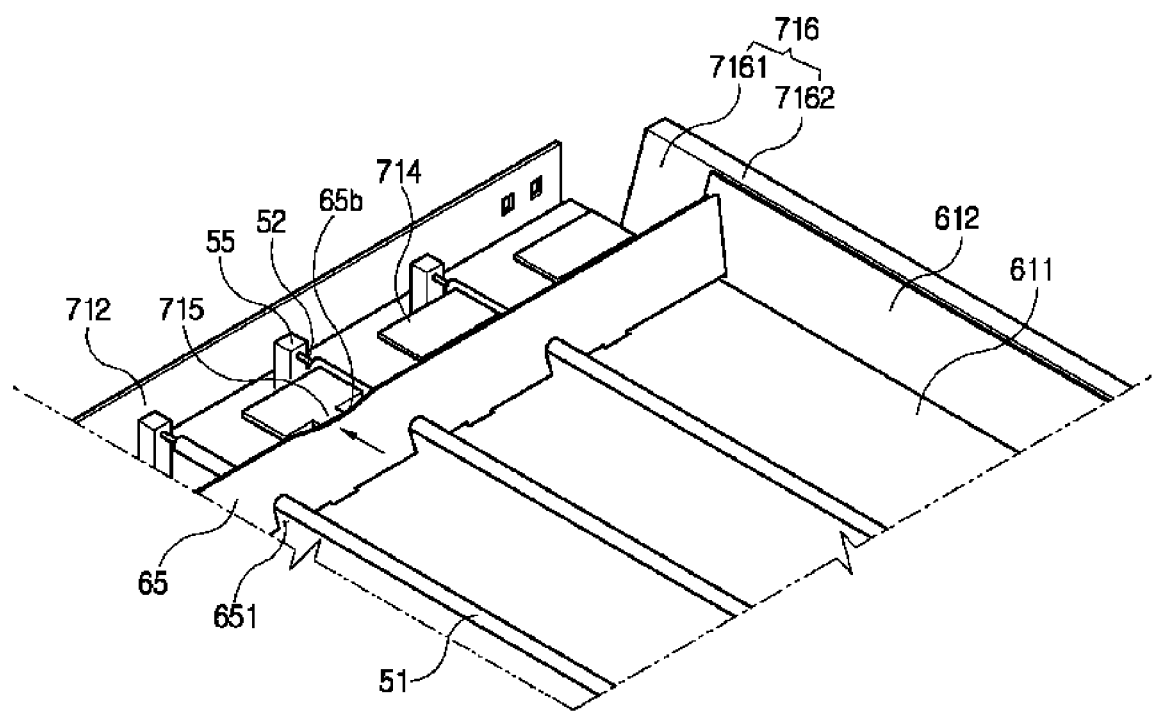

As shown in FIG. 7D, the upper side 65b of the second reflective member 65 is pushed toward the second container component 712 in the first direction. The pressure of the second reflective member 65 being pushed in the first direction causes the fifth container component 715 to be bent upwardly. The upper side 65b of the second reflective member 65 moves backward (e.g., in the opposite direction from which it was pushed), resulting in restoration of the fifth container component 715 to its original position. Thus configured, the second reflective member 65 is coupled to the fifth container component 715 (third coupling). The completed first through third couplings are shown in FIG. 3.

As described above, the second reflective member 65 is coupled to the first reflective member 61 and the lower container 70 by relatively simple method.

Figure 8:
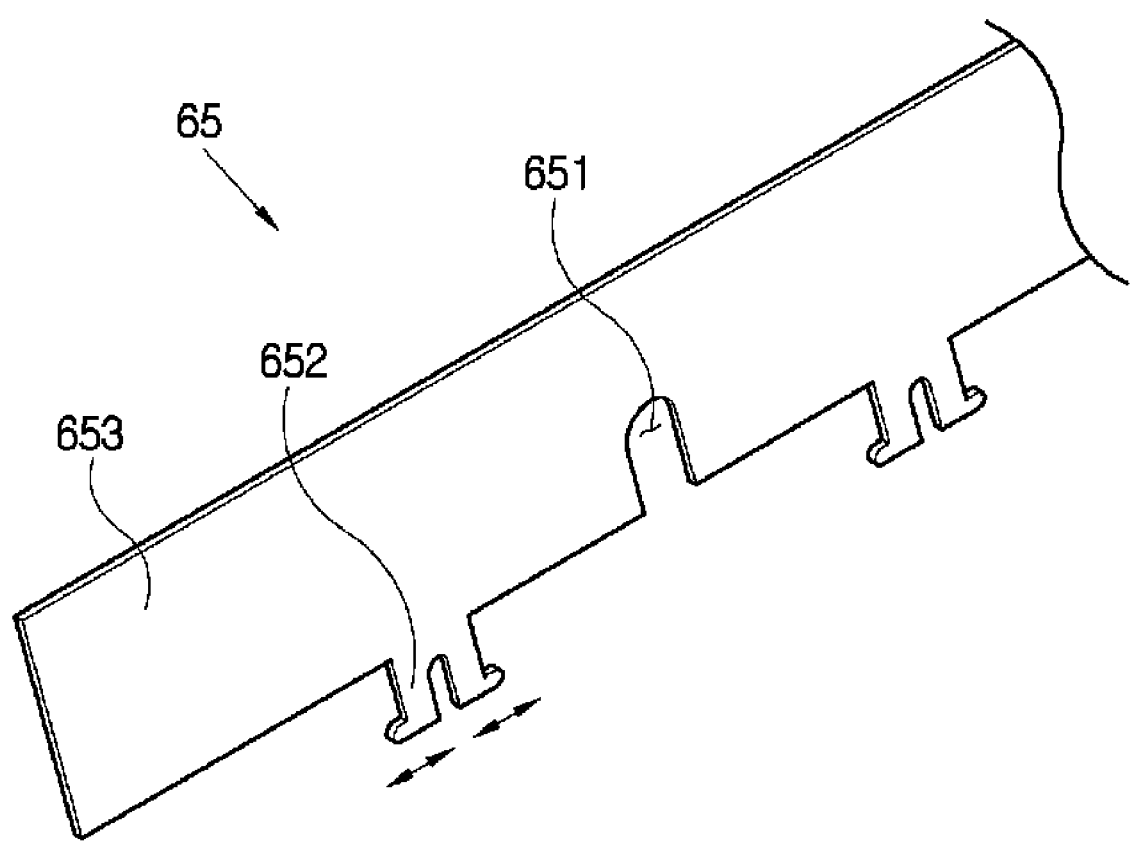
FIG. 8 is a perspective view of a second reflective member of the liquid crystal display device according to a second exemplary embodiment of the present invention.

A second exemplary embodiment of the present invention will now be described with reference to FIG. 8.

In the second exemplary embodiment, a protrusion 652 of a second reflective member 65 is provided to be transformable (e.g., repositioned) in a second direction.

If a coupling through hole 613 corresponds to a first portion 7181 of the container cutting part 718 that is relatively narrow as compared with other container cutting parts 718, a width of the coupling through hole 613 and the container cutting part 718 are formed to be shorter than the width of protrusion 652 that is not transformed, in the second direction.

While passing through the coupling through hole 613 and the container cutting part 718, the protrusion 652 is transformed. That is, the width of the protrusion 652 is narrowed due to pressure applied to each side thereof, thereby allowing passage of the protrusion 652 through the coupling through hole 613 and the container cutting part 718. Once engaged, the protrusion 652 is restored to its original state. In the coupling state, the protrusion 652 contacts a rear side of a first container component 711, thereby preventing separation of the reflective member 60 from the lower container 70.

If the coupling through hole 613 corresponds to a second portion 7181 that is relatively wide compared with other container cutting parts 718, a width of the coupling through hole 613 is configured to be shorter than a width of the protrusion 652 that is not transformed, in the second direction.

While passing through the coupling through hole 613, the protrusion 652 is transformed. That is, the width of the protrusion 652 is narrowed due to pressure applied to each side thereof, thereby allowing passage of the protrusion 652 through the coupling through hole 613. Once engaged, the protrusion 652 is restored to its original state. In the coupling state, an end part of the protrusion 652 contacts a rear side of a first container component 711, thereby preventing separation of the reflective member 60 from the lower container 70.

Figure 9:
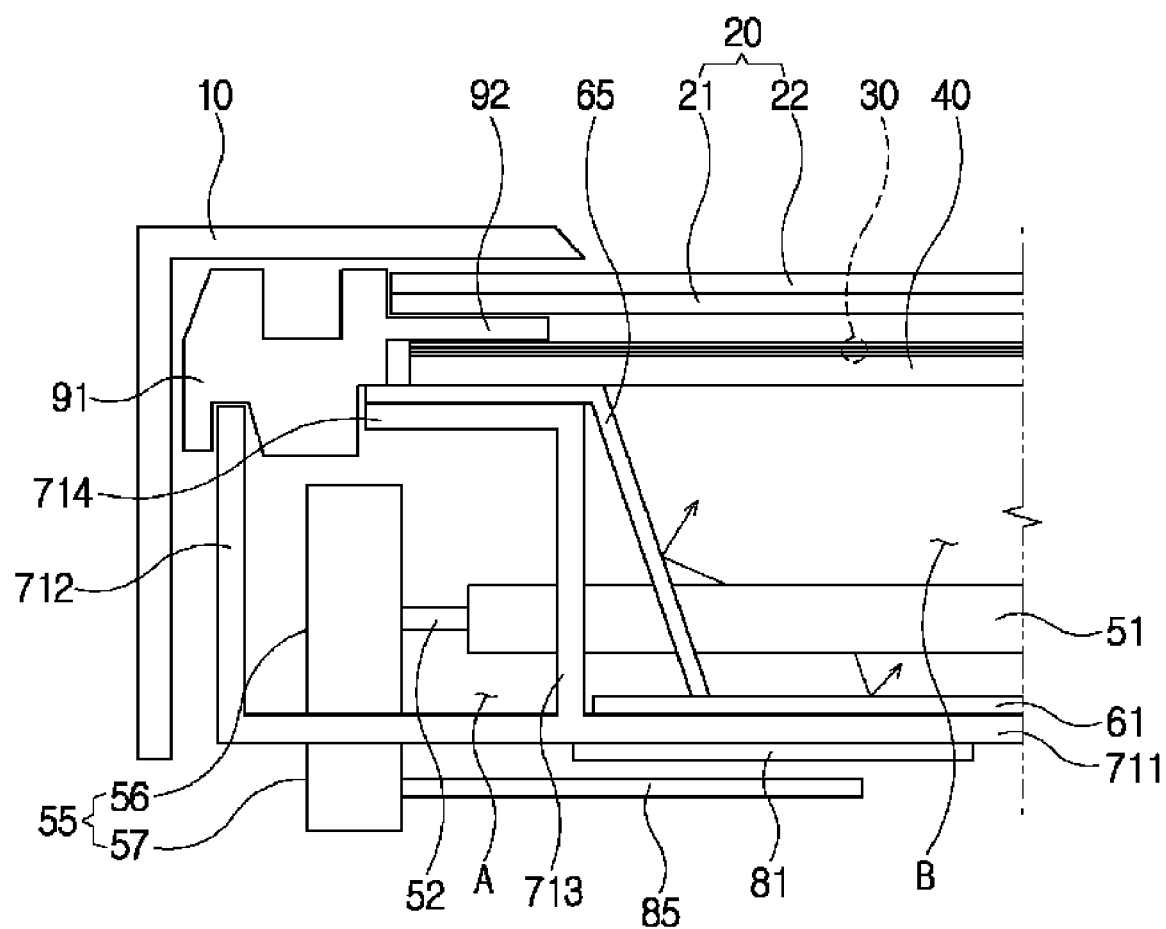
FIG. 9 is a cross-sectional view of a liquid crystal display device according to a third exemplary embodiment of the present invention.

A third exemplary embodiment of the present invention will now be described with reference to FIG. 9.

A second reflective member 65 is partially extended between a fourth container component 714 and a diffusion plate 40. Although not shown, the second reflective member 65 may be formed with a projection protruding toward the fourth container component 714, and the fourth container component 714 may be formed with a coupling hole corresponding to the projection.

Figure 10:
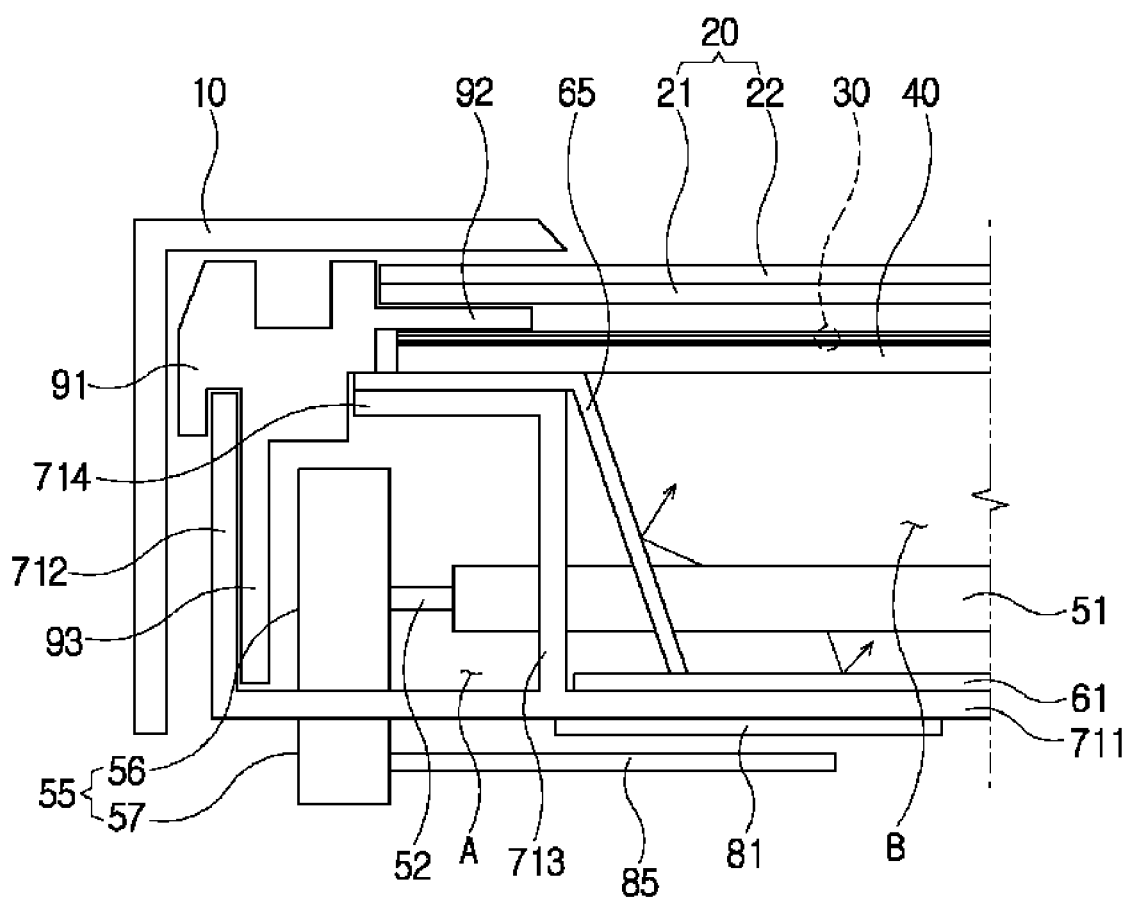
FIG. 10 is a cross-sectional view of a liquid crystal display device according to a fourth exemplary embodiment of the present invention.

A fourth exemplary embodiment of the present invention will now be described with reference to FIG. 10.

A mold 90 includes a third mold part 93 extended from a second mold part 92 toward a first container component 711.

The third mold part 93 faces an interior surface of a second container component 712 and covers a container through hole 719. The third mold part 93 prevents foreign materials from entering an accommodating space A through the container through hole 719.

Figure 11:
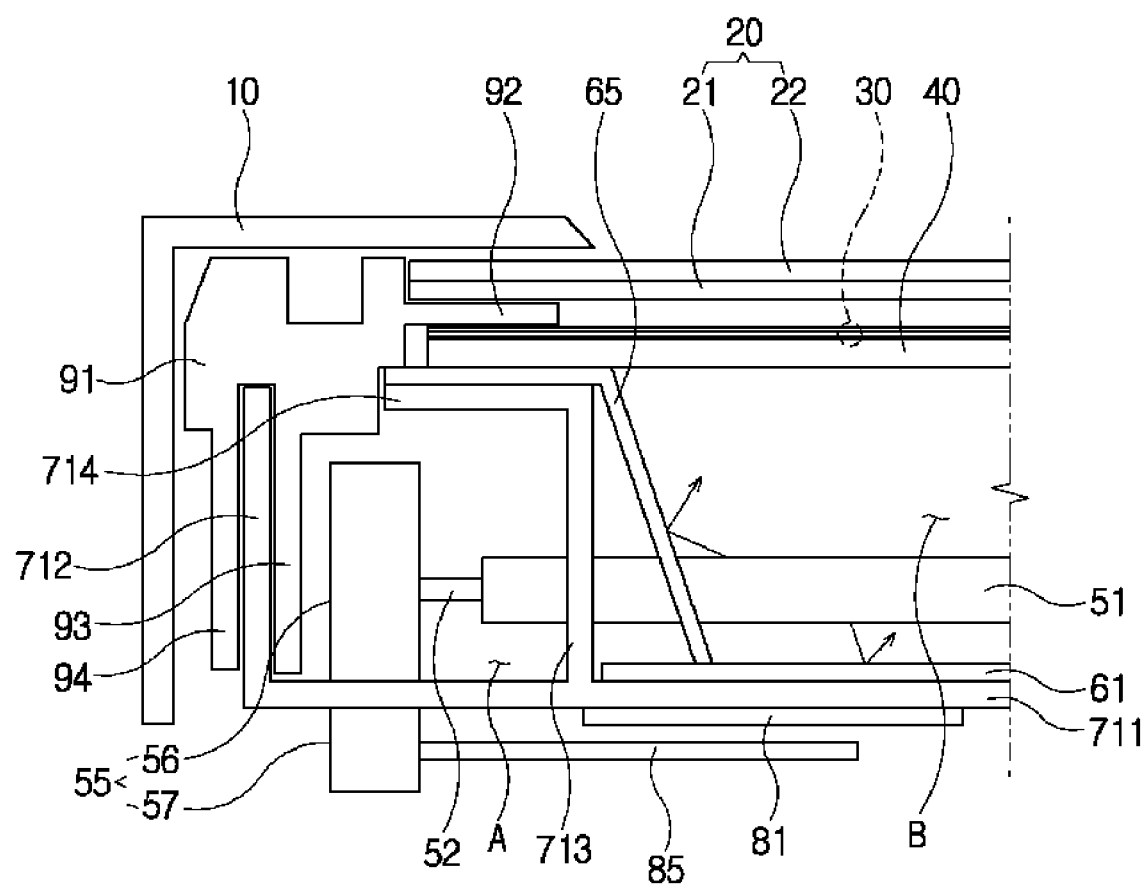
FIG. 11 is a cross-sectional view of a liquid crystal display device according to a fifth exemplary embodiment of the present invention.

A fifth exemplary embodiment of the present invention will now be described with reference to FIG. 11.

A mold 90 includes a third mold part 93 and a fourth mold part 94 which are extended from a second mold part 92 toward a first container component 711.

The third mold part 93 faces an interior surface of a second container component 712, and the fourth mold part 94 faces an exterior surface of the second container component 712, so that they cover a container through hole 719. The third mold part 93 and the fourth mold part 94 prevent foreign materials from entering an accommodating space A through the container through hole 719.

As described above, the exemplary embodiments of the present invention provide a liquid crystal display device having a simple configuration.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A liquid crystal display device comprising:
    a liquid crystal display panel;
    a plurality of lamps disposed behind the liquid crystal display panel;
    a container which accommodates the lamps and comprises a first container component parallel with the liquid crystal display panel and disposed behind the lamp, a second container component upwardly bent from an end part of the first container component, a third container component that is cut away from the first container component and is upwardly bent from the first container component and a fourth container component which is bent from an upper end part of the third container component and extends toward the second container component and in parallel with the liquid crystal display panel; and
    a reflective member comprising a first reflective member at least partially disposed between the first container component and the lamp, and a second reflective member separated from the first reflective member and covering the third container component.

2. The liquid crystal display device according to claim 1, wherein an end part of the lamp is disposed between the second and third container components.

3. The liquid crystal display device according to claim 1, further comprising an optical plate disposed between the liquid crystal display panel and the lamp, and
    the fourth container component supports an end part of the optical plate.

4. The liquid crystal display device according to claim 1, wherein the third container component is plurally provided and arranged in a transverse direction to a lengthwise direction of the lamp, and
    the lamp is arranged between neighboring third container components.

5. The liquid crystal display device according to claim 4, wherein the second reflective member is extended in a direction transverse to the lengthwise direction of the lamp, the second reflective member comprising a lower side facing the first container component, an upper side facing the liquid crystal display panel, and an accommodating cutting part to accommodate the lamp.

6. The liquid crystal display device according to claim 5, wherein the container further comprises:
    a fifth container component which holds the upper side of the second reflective member and prevents the upper side of the second reflective member from moving inward.

7. The liquid crystal display device according to claim 6, wherein:
    the container further comprises a sixth container component extended parallel with an extending direction of the lamp and is upwardly bent from an end part of the first container component,
    the first reflective member is extended over the sixth container component; and
    the sixth container component and the first reflective member corresponding to the sixth container component are formed with coupling cutting parts to be coupled with end parts of the second reflective member, respectively.

8. The liquid crystal display device according to claim 1, wherein the first container component comprises a container cutting part which corresponds to the third container component.

9. The liquid crystal display device according to claim 8, wherein:
    the first reflective member comprises a coupling through hole corresponding to the container cutting part, and
    the second reflective member comprises a protrusion which protrudes from a lower side facing the first container component and passes through the coupling through hole and the container cutting part.

10. The liquid crystal display device according to claim 8, further comprising a light blocking member attached to a rear surface of the first container component and covering the container cutting part.

11. The liquid crystal display device according to claim 1, wherein the second reflective member is arranged at an obtuse angle with respect to the first container component.

12. The liquid crystal display device according to claim 1, further comprising a lamp socket which is at least partially disposed between the second container component and the third container component and connected with an end part of the lamp to supply power to the lamp.

13. The liquid crystal display device according to claim 12, further comprising an inverter placed on a rear surface of the first container component,
    wherein the first container component outside the third container component is formed with a socket through hole, and
    the lamp socket comprises a socket main body to be connected with an end part of the lamp, and an inverter connecting part exposed to an outside of the container through the socket through hole and connected to the inverter.

14. The liquid crystal display device according to claim 1, further comprising an optical plate disposed between the liquid crystal display panel and the lamp, and a mold frame,
    the mold frame comprising a first mold part supported by the second container component, and a second mold part extended from the first mold part over the optical plate, and
    an end part of the liquid crystal display panel is seated on the second mold component.

15. The liquid crystal display device according to claim 14, wherein:
    the second container component is formed with a container through hole, and
    the mold further comprises a third mold part extended from the first mold component to an inside of the second container and covering the container through hole.

16. The liquid crystal display device according to claim 15, wherein the mold further comprises a fourth mold part extended from the first mold component to an outside of the second container and covering the container through hole.

17. A liquid crystal display device comprising:
    a liquid crystal display panel;
    a plurality of lamps disposed behind the liquid crystal display panel;
    an optical plate disposed between the liquid crystal panel and the lamp;
    a container which accommodates the lamp therein; and
    a reflective member which is at least partially disposed between the container and the lamp and surrounds a lighting space together with the optical plate, the container supporting an end part of the optical plate, and the reflective member comprising a first reflective member at least partially disposed between the first container component and the lamp, and a second reflective member separated from the first reflective member and formed with an accommodating cutting part to accommodate the lamp, wherein the container comprises:

a first container component parallel with the liquid crystal display panel and disposed behind the lamp;

a second container component upwardly bent from an end part of the first container component;

a third container component that is cut away from the first container component and is upwardly bent from the first container component; and a fourth container component which is bent from an upper end part of the third container component and extends toward the second container component and in parallel with the liquid crystal display panel.

18. The liquid crystal display device according to claim 17, wherein an end of the optical plate is seated on the fourth container component.

19. The liquid crystal display device according to claim 18, wherein the second reflective member is at least partially disposed between the lighting space and the third container component.

20. The liquid crystal display device according to claim 18, wherein the second reflective member is extended in a direction transverse to the lengthwise direction of the lamp, the second reflective member comprising a lower side facing the first container component, an upper side facing the liquid crystal display panel, and an accommodating cutting part to accommodate the lamp therein.

21. The liquid crystal display device according to claim 18, wherein the third container component is plurally provided and arranged in a transverse direction to the lengthwise direction of the lamp, and the lamp is arranged between neighboring third container components.

22. The liquid crystal display device according to claim 18, wherein the first container component comprises a container cutting part corresponding to the third container part.

23. The liquid crystal display device according to claim 18, wherein the second reflective member is arranged at an obtuse angle with respect to the first container component.

* * * * *